United States Patent
Maddox et al.

(10) Patent No.: US 6,651,592 B2
(45) Date of Patent: Nov. 25, 2003

(54) AUTOMATIC POSITIVE BEHAVIOR REINFORCEMENT TRAINER

(75) Inventors: Scott E. Maddox, Fort Wayne, IN (US); Curtis C. McLay, Fort Wayne, IN (US); Craig M. Spahr, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

(21) Appl. No.: 10/079,242

(22) Filed: Feb. 20, 2002

(65) Prior Publication Data

US 2003/0154930 A1 Aug. 21, 2003

(51) Int. Cl.[7] ............................................. A01K 15/02
(52) U.S. Cl. ...................... 119/720; 119/712; 119/859; 119/860; 119/908
(58) Field of Search ................. 119/720, 53.5, 119/712, 718, 719, 859, 860, 862, 908, 905, 765; 222/650

(56) References Cited

U.S. PATENT DOCUMENTS

| | | | |
|---|---|---|---|
| 3,204,608 A | 9/1965 | Snitz | 119/54 |
| 3,673,567 A | 6/1972 | McClellan, Sr. | 340/148 |
| 4,180,013 A | 12/1979 | Smith | 119/29 |
| 4,267,799 A | 5/1981 | Bacon | 119/29 |
| 4,627,385 A | 12/1986 | Vinci | 119/29 |
| 4,669,424 A * | 6/1987 | Bianco et al. | 119/156 |
| 4,770,125 A | 9/1988 | Gold et al. | 119/53.5 |
| 4,823,738 A | 4/1989 | Gold | 119/51 |
| 4,889,077 A | 12/1989 | Possis | 119/51.11 |
| 4,947,795 A | 8/1990 | Farkas | 119/29 |
| 5,046,453 A | 9/1991 | Vinci | 119/29 |
| 5,054,428 A | 10/1991 | Farkus | 119/29 |
| 5,078,097 A | 1/1992 | Chishohlm | 119/51.13 |
| 5,351,653 A | 10/1994 | Marischen et al. | 119/719 |
| 5,601,054 A * | 2/1997 | So | 119/718 |
| 5,605,116 A * | 2/1997 | Kim et al. | 119/720 |
| 5,669,328 A * | 9/1997 | Lanfranchi | 119/57.92 |
| 5,749,324 A | 5/1998 | Moore | 119/719 |
| 5,799,618 A | 9/1998 | Van Curen et al. | 119/721 |
| 5,809,939 A * | 9/1998 | Robart et al. | 119/712 |
| 5,815,077 A | 9/1998 | Christiansen | 340/573 |
| 5,872,516 A | 2/1999 | Bonge | 340/573 |
| 5,913,284 A | 6/1999 | Van Curen et al. | 119/720 |
| 5,927,233 A | 7/1999 | Mainini et al. | 119/718 |
| 5,957,093 A * | 9/1999 | Balaun | 119/859 |
| 6,019,066 A | 2/2000 | Taylor | 119/720 |
| 6,058,889 A | 5/2000 | Van Curen et al. | 119/721 |
| 6,073,589 A | 6/2000 | Curen et al. | 119/720 |
| 6,263,836 B1 * | 7/2001 | Hollis | 119/712 |
| 6,273,027 B1 * | 8/2001 | Watson et al. | 119/712 |
| 2002/0046713 A1 * | 4/2002 | Otto | 119/720 |

FOREIGN PATENT DOCUMENTS

| | | | | |
|---|---|---|---|---|
| DE | 3300486 A * | 1/1983 | | A01K/15/02 |
| DE | 3237927 | 4/1984 | | A01K/15/02 |
| DE | 3405171 | 8/1985 | | A01K/15/02 |
| DE | 4133864 | 4/1993 | | A01K/15/02 |
| FR | 2571219 | 4/1986 | | A01K/15/02 |
| FR | 2625646 | 6/1989 | | A01K/15/00 |
| JP | 40811247 | 5/1996 | | A01K/15/02 |

* cited by examiner

*Primary Examiner*—Peter M Poon
*Assistant Examiner*—Andrea M. Valenti
(74) *Attorney, Agent, or Firm*—Taylor & Aust, P.C.

(57) ABSTRACT

An automatic animal behavior trainer, including an animal collar with a behavior detector and a transmitter communicatively connected to the behavior detector and a reward dispenser separate from the animal collar, the reward dispenser including a first processor in wireless communication with the behavior detector by way of the transmitter.

16 Claims, 3 Drawing Sheets

US 6,651,592 B2

AUTOMATIC POSITIVE BEHAVIOR REINFORCEMENT TRAINER

BACKGROUND OF THE INVENTION

1. Field of the Invention

The present invention relates to a behavior reinforcement trainer, and, more particularly, to an automatic positive behavior reinforcement trainer.

2. Description of the Related Art

There are three ways in which problem behavior in pets can be modified and which are commonly recommended by animal trainers:
1) Ignore the behavior. The concept is that the behavior goes unrewarded and will extinguish itself and a new behavior will take its place which is rewarded.
2) Punishment. The concept is that when undesirable behavior is detected an uncomfortable or painful consequence is provided. The animal modifies the behavior to avoid the unpleasant consequences.
3) Reward. Animal behavior which is rewarded is reinforced and will displace undesirable behavior.

Technology has focused almost exclusively on (#2) punishment as the manner in which to enforce behavior of animals. Punishment takes many forms, the instrument of which is usually carried on a collar of the animal, such devices provide an electrical shock, constriction of the collar, mechanical impulses, temperature variations on the skin of the animal, unpleasant odors and/or unpleasant sound. Detection of negative behavior takes the form of sound detection and detection of the vibration of vocal cords. Even the location of the animal relative to a border or some other defined area from which the animal is to be excluded will lead to the automatic punishment of an animal.

Although the use of punishment is an effective stand alone tactic, it becomes more effective for animal trainers to follow this method up with a positive reinforcement technique. The follow up with a positive reinforcement technique requires knowledge and time consuming effort on the part of the animal trainers.

Training philosophies relative to (#1) ignoring animal behavior and (#3) reward abound, the implementation of these philosophies require observation by the animal trainer to recognize the behavior that is to be rewarded. Therein lies the difficulty of implementing such a training philosophy, the trainer must act as the observer of the behavior which is worthy of reward. Not only do these approaches require time of the human trainer, but as a result the animal may discern that such behavior is only necessary in the presence of the trainer from which a reward may be obtained.

What is needed in the art is a method and an apparatus which modifies the behavior of animals by detecting positive behavior and reinforcing the positive behavior.

SUMMARY OF THE INVENTION

The present invention provides for the automated detection of positive behavior by an animal and the reinforcement of the positive behavior using a sequence profile.

The invention comprises, in one form thereof, an automatic animal behavior trainer. The automatic animal behavior trainer includes an animal collar with a behavior detector and a transmitter communicatively connected to the behavior detector and a reward dispenser separate from the animal collar, the reward dispenser including a first processor in wireless communication with the behavior detector by way of the transmitter.

An advantage is that positive behavior is detected and rewarded.

Another advantage of the present invention is that the detection of positive behavior does not require the observations of a human trainer.

Yet another advantage is that the present invention is automated allowing the behavior to be continuously monitored and modified in a consistent manner.

A further advantage is that the reward dispenser is programmable with reward profiles.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
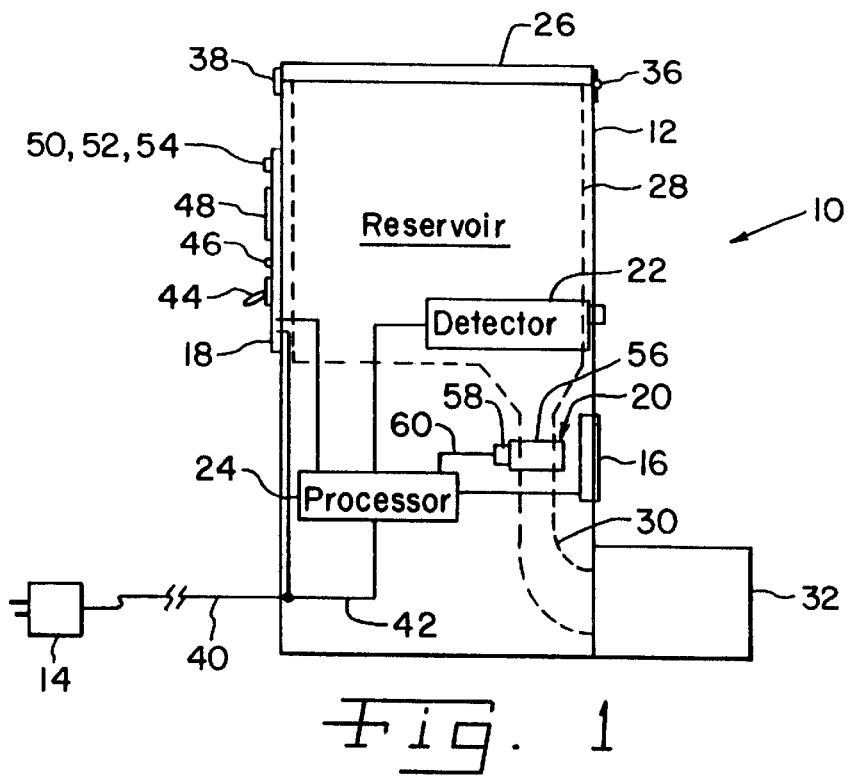
FIG. 1 is a schematic view of one embodiment of an automatic positive behavior reinforcement trainer of the present invention.
Figure 2:
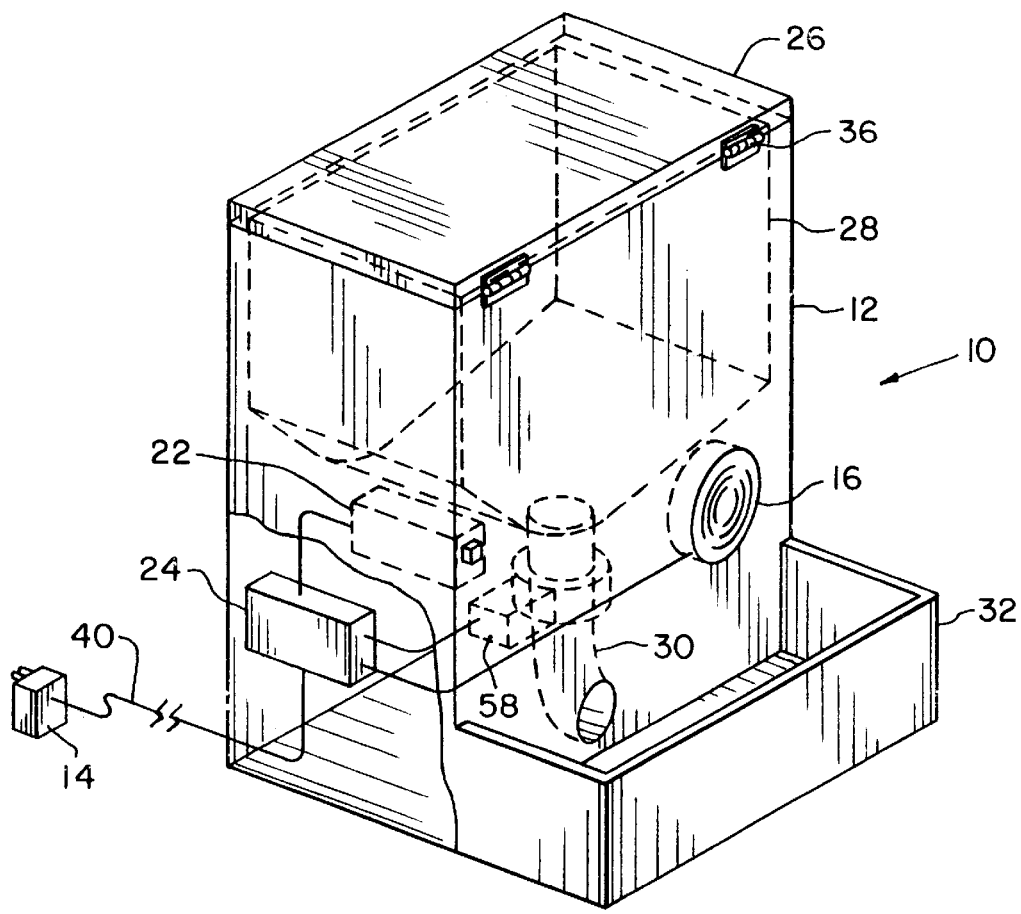
FIG. 2 is a partially sectioned perspective view of the automatic positive behavior reinforcement trainer of FIG. 1.

Referring now to the drawings, and more particularly to FIGS. 1 and 2, there is shown an automatic positive behavior reinforcement trainer 10 which includes a housing 12, a power supply 14, an audio speaker 16, a control panel 18, a reward dispenser 20, a behavior detector 22 and a processor assembly 24.

Housing 12 includes a hinged lid 26, a reward reservoir 28, a delivery tube 30, a feeding trough 32 and latching hooks 34. Housing 12 is formed of metal and/or plastic material to protect the contents from weather and to prevent an animal from gaining access.

Hinged lid 26 is hingedly connected to housing 12 along one edge of hinged lid 26 by hinges 36. Latch 38 is provided along a side of hinged lid 26 opposite the edge which is connected to hinges 36. Latch 38 is used to secure hinged lid 26 to the body of housing 12.

Reward reservoir 28 is shaped to store primary reinforcements (also referred to as rewards or treats), such as food treats, and to funnel food treats to reward dispenser 20. Treats are selected which are desirable to the animal and include food, liquid, odor and/or sound, Reward dispenser 20 is located adjacent to reward reservoir 28 and is connected thereto to facilitate access of reward dispenser 20 to treats in reward reservoir 28. Reward reservoir 28 may have a lid separate from hinged lid 26. If the treat to be dispensed is an odor then reward reservoir 28 will take the form of an enclosed container. If the treat to be dispensed is an audio signal then reward reservoir 28 takes the form of a recorded audio medium.

Delivery tube 30 directs a treat from reward dispenser 20 to feeding trough 32. Alternatively, if housing 12 is suspended on a wall above ground level, delivery tube 30 is disposed such that a treat is directed to the ground. If the treat to be dispensed is odor then delivery tube 30 is disposed to direct the odor toward the animal.

Feeding trough 32 protrudes from one side of housing 12 to catch a dispensed food treat and feed trough 32 is shaped to allow an animal the ability to retrieve a dispensed food treat. Feed trough 32 is detachable from the body of housing 12 to allow a food treat to fall onto the ground, particularly if trainer 10 is suspended on a wall.

Figure 3B:
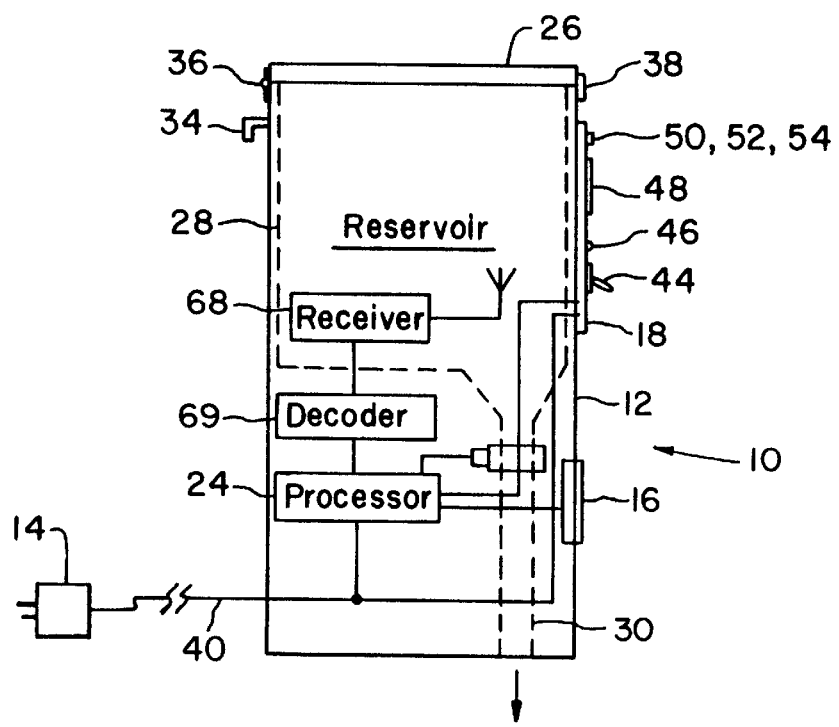
FIGS. 3A and 3B depict another embodiment of an automatic positive behavior reinforcement trainer embodying the present invention.

Latching hooks 34, as shown in FIG. 3B, are located on the back of housing 12 to allow trainer 10 to be secured to a wire fence or a wall at ground level or to be suspended from a fence or wall above ground level.

Power supply 14 includes power cord 40 and interconnecting power wires 42. Power supply 14 supplies power to control panel 18, behavior detector 22 and processor 24. Power supply 14 is an AC/DC wall plug module which may contain a battery to provide power when not connected to a power source.

Power cord 40 provides for a connection from power supply 14 to trainer 10. Power cord 40 may also provide a safety ground to trainer 10. Interconnecting power wires 42 distribute power from power cord 40 to control panel 18, behavior detector 22 and processor 24.

Audio Speaker 16, also known as a secondary reinforcement device, is attached to housing 12. Holes are provided in housing 12 to accommodate the transmission of sound from audio speaker 16 to the surrounding environment.

Control panel 18 is disposed on the top of a side of housing 12, providing a programmable interface to a user. Control panel 18 includes an off/on switch 44, an on indicator 46, a display 48, a sequence selector 50, time setting buttons 52 and a reset button 54. Alternatively, control panel 18 may be positioned vertically or horizontally along any side of housing 12 and control panel 18 may be located under hinged lid 26.

Off/on switch 44 applies and removes power from trainer 10. Off/on switch 44 is connected in series with power cord 40 and interconnecting power wires 42. On indicator 46 is connected to Off/on switch 44 and illuminates when power is applied to trainer 10 and off/on switch 44 is in an on position.

Display 48 is an alpha-numeric liquid crystal display which can selectively display at least one of the current time, the time to the next reward, the status of the reservoir contents, the sequence selected and/or the number of rewards dispensed. Sequence selector 50 provides for the selection of different training profiles. Time setting buttons 52 allow the current time of day to be entered. The time may be used by a training profile algorithm, also known as a sequence profile. Reset button 54 allows trainer 10 to be reset to an initial state. Trainer 10 would need to be reset in the event that the subject animal is changed or perhaps when the subject animal is removed from and returned to an enclosure where trainer 10 is located.

Reward dispenser 20 includes gating mechanism 56 and electrical activator 58. Reward mechanism 20 is connected to reward reservoir 28 for access to the supply of primary reinforcements, such as a food treat, and to processor 24 for the receipt of a signal to dispense a food treat.

Gating mechanism 56 is connected to reward reservoir 28 and delivery tube 30. When gating mechanism 56 is activated a treat is sequenced from reward reservoir 28 and placed in delivery tube 30 which directs the travel of the treat. If a pressurized odor is the treat, gating mechanism 56 takes the form of a valve.

Electrical activator 58 is a motor which is connected to gating mechanism 56 and activates gating mechanism 56. Electrical activator 58 is electrically connected to processor 24, by way of signal wires 60, for the receipt of an activating signal therefrom.

Behavior detector 22 is mounted in housing 12 with access provided through the wall of housing 12 to allow behavior detector 22 to detect the behavior of the subject animal. Power supply 14 supplies electrical power to behavior detector 22 by way of interconnecting power wires 42. Behavior detector 22 include sensors to detect at least one of sound, visual images, vibration, gnawing pressure or scratching behavior and provides the information to processor 24 by way of signal line 62.

Figure 4:
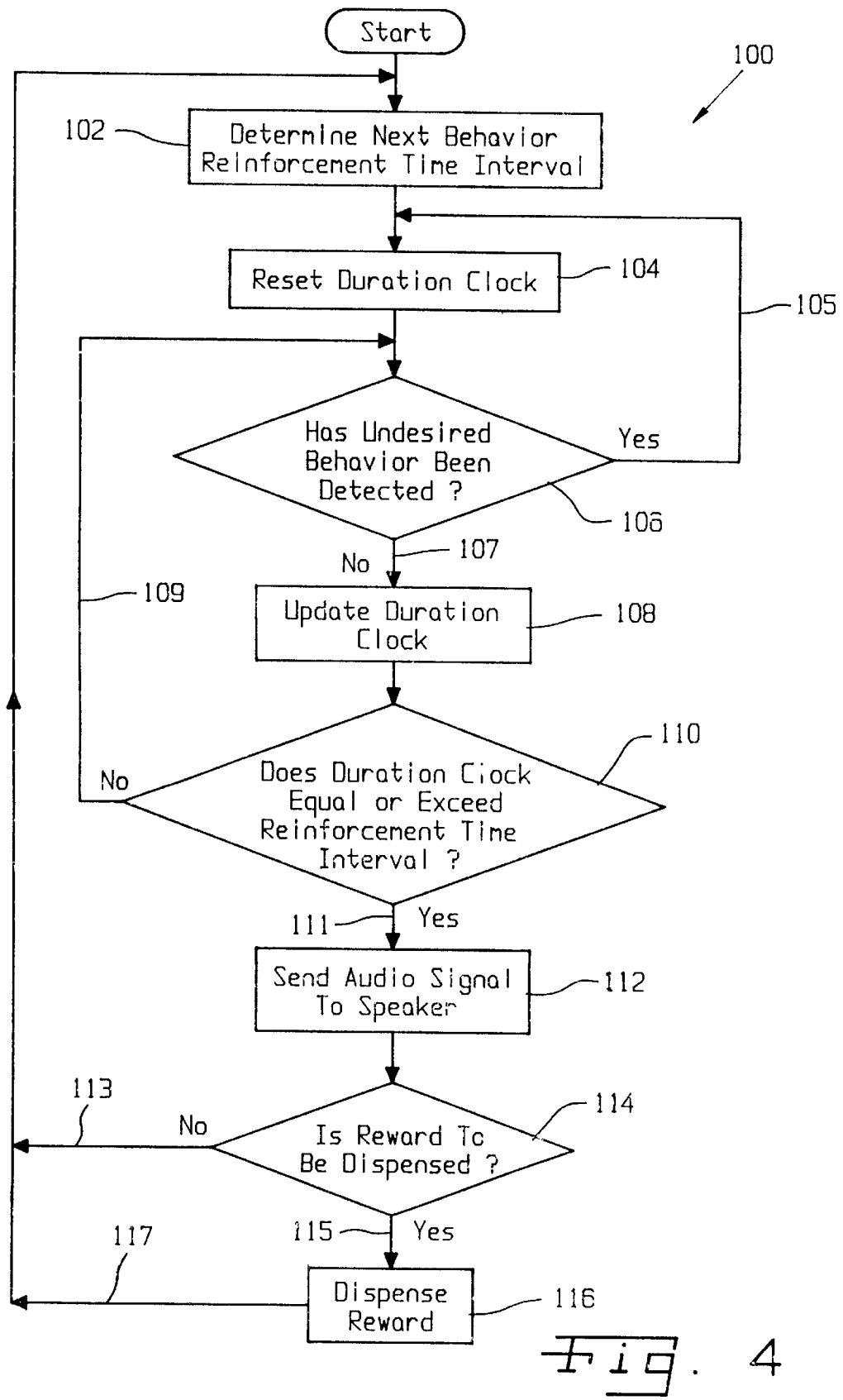
FIG. 4 depicts a flow diagram of a method for modifying the behavior of an animal using positive reinforcement with either of the embodiments of the present invention illustrated in FIGS. 1, 2, 3A and 3B.

Processor 24 includes a microprocessor, memory and software algorithms stored in the memory. At least one of the algorithms stored in the memory of processor 24 includes operating program 100 as depicted in FIG. 4, and explained in further detail herein. Power supply 14 supplies power to processor 24 by way of interconnecting power wires 42. Processor 24 processes signals that it receives from behavior detector 22 relative to the behavior of the subject animal and distinguishes desired behavior from undesired behavior. The processing of the signals entail decision making relative to the behavior of the subject animal and timing of the dispensing of a primary reinforcement and/or a secondary reinforcement.

Primary reinforcement is a reward or treat which provides a pleasurable sensory response to the subject animal. A secondary reinforcement is normally provided to the subject animal at substantially the same time as the primary reinforcement and is provided so that the subject animal will associate the secondary reinforcement with the primary reinforcement. Once an association has been established by the subject animal of the secondary reinforcement with the primary reinforcement, the secondary reinforcement is used to replace at least a part of the primary reinforcements. In this embodiment of the present invention a primary reinforcement of food is used and a sound signal is used as a secondary reinforcement.

Figure 3A:
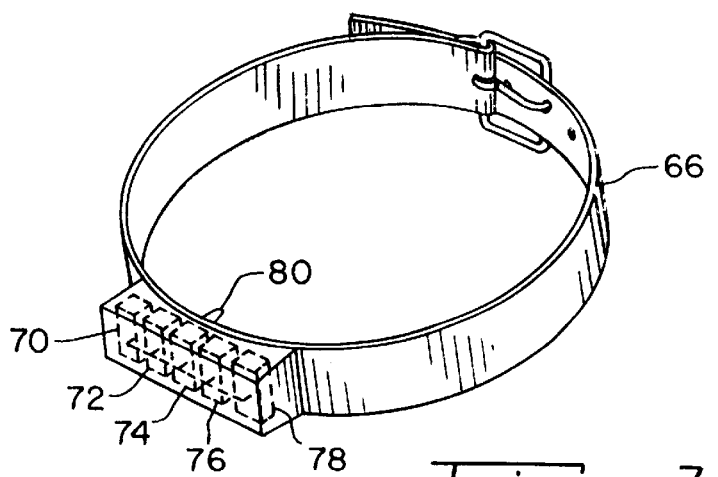

Now, additionally referring to FIGS. 3A and 3B, another embodiment of the invention is depicted. This embodiment is substantially similar to the previous embodiment except that behavior detector 22 is located on a collar 66 rather than in housing 12 and additionally a receiver 68 and a decoder 69 are contained in housing 12. This embodiment is provided to allow trainer 10 to distinguish between animals in an environment, such as a kennel, where multiple animals are present.

Collar 66 includes battery 70, vibration sensor 72, second processor 74, encoder 76, transmitter 78 and bark probe 80. Battery 70 provides electrical power to vibration sensor 72, second processor 74, encoder 76 and transmitter 78. Vibration sensor 72 is mechanically coupled with bark probe 80. Vibration sensor 72 is a piezo-electric device capable of translating mechanical vibration, such as that imparted by bark probe 80, into an electrical signal. Bark probe 80 touches the skin of the subject animal transferring vibratory energy to vibration sensor 72.

Second processor 74 is communicatively coupled with vibration sensor 72 and encoder 76. The output of vibration sensor 72 is analyzed to algorithmically determine if an undesirable noise, such as a bark, has occurred. If a bark has occurred, second processor 74 sends information to encoder 76.

Encoder 76 is communicatively coupled to second processor 74 and transmitter 78. Encoder 74 receives information from second processor 74 encodes the information such that trainer 10 will only respond to one collar 66. Once the information is encoded, it is sent to transmitter 78. Alternatively, the function of encoder 76 may be performed by second processor 74.

Transmitter 78 is a radio frequency transmitter, including a ferrite antenna element, which transmits encoded information from encoder 76. The transmission is intended to be received by receiver 68. Receiver 68 is contained in housing 12 and is communicatively coupled to transmitter 78 and decoder 69. Receiver 68 receives an encoded signal from transmitter 78 and passes the encoded signal to decoder 69. Decoder 69 is communicatively coupled with receiver 68 and processor 24. Decoder 69 receives an encoded signal from receiver 68, decodes the signal and passes the signal to processor 24. Alternatively, the function of decoder 69 may be performed by processor 24.

Now additionally referring to FIG. 4, there is depicted a plurality of processing steps that are typically executed by processor 24 of any of the previous embodiments of the invention. At the point of beginning of operating program 100, processor 24 determines the time interval until dispensing of the next behavior reinforcement (block 102). The time until the next behavior reinforcement action is determined from a sequence profile which has been preprogrammed into the memory of processor 24 and selected by sequence selector 50. Sequence profiles include fixed interval, variable interval, pseudo-random interval and random interval algorithms. Each sequence profile further includes a determination of whether only a secondary reinforcement is to be utilized as a reinforcement action.

At block 104 a duration clock is reset to zero. The duration clock can either be a hardware register or a software memory location. Processor 24 determines if undesired behavior has been detected by behavior detector 22 (decision block 106). If processor 24 determines that undesirable behavior has been detected then the process loops back to block 104 (line 105). If undesired behavior is not detected (line 107), then the duration clock is updated to indicate the amount of time elapsed since the duration clock was last reset at block 104 (block 108).

Processor 24 determines if the duration clock is equal to or exceeds the reinforcement interval (decision block 110). If processor 24 determines that the duration clock does not equal or exceed the reinforcement interval then the process loops back to block 106 (line 109). If processor 24 determines that the duration clock does equal or exceed the reinforcement interval (line 111), then processor 24 dispenses a secondary reinforcement by sending an audio signal to speaker 16 (block 112). The audio signal is a secondary reinforcement which may be any form of audio signal including clicks, tones or speech.

Processor 24 determines if a primary reinforcement in the form of a reward is to be dispensed (block 114). If processor 24 determines that no reward is to be dispensed, then the process loops back to block 102, the point of beginning (line 113). If processor 24 determines that a reward is to be dispensed (line 115), then processor 24 sends a signal to reward dispenser 20 causing electrical activator 58 to actuate gating mechanism 56 and thereby dispensing a primary reinforcement in the form of a reward or treat (block 116). The process then loops back to block 102, the point of beginning (line 117).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An automatic animal behavior trainer, comprising:
   an animal collar including a behavior detector and a transmitter communicatively connected to said behavior detector;
   a reward dispenser separate from said animal collar, said reward dispenser including a first processor in wireless communication with said behavior detector by way of said transmitter, said first processor discriminating between desirable and undesirable behavior in an animal, said reward dispenser is a primary reinforcement dispenser configured to dispense a primary reinforcement to said animal; and
   a secondary reinforcement device configured to provide a secondary reinforcement to said animal such that said animal associates said secondary reinforcement with said primary reinforcement, said primary reinforcement being at least partially replaced by said secondary reinforcement;
   the automatic animal behavior trainer executing the steps of:
   detecting a behavior of said animal with said behavior detector;
   wirelessly transmitting a signal to said first processor indicative of said behavior;
   controlling said reward dispenser by said first processor dependent upon said signal;
   utilizing a sequence profile to determine a time interval until said reward dispenser is activated;
   if said behavior is not detected then determining if said time interval has been at least one of equaled and exceeded if said time interval has ben at least one of equaled and exceeded then further comprising the steps of;
   dispensing said secondary reinforcement;
   determining if said primary reinforcement is to be dispensed by said reward dispenser; and
   at least partially replacing said primary reinforcement with said secondary reinforcement.

2. The trainer of claim 1, wherein said first processor comprises:
   a microprocessor; and
   a memory communicatively connected with said microprocessor, said memory containing a plurality of operating steps, said memory further containing sequence profiles, said sequence profiles determining when one of said secondary reinforcement and said primary reinforcement are dispensed.

3. The trainer of claim 2, wherein at least one of said sequence profiles includes a pattern which determines when only said secondary reinforcement is dispensed in lieu of said primary reinforcement.

4. The trainer of claim 1, wherein said reward dispenser further comprises:
   a reward reservoir configured to contain a primary reinforcement, said primary reinforcement being at least one of food treats, liquid treats and odors; and
   a dispensing mechanism having access to said primary reinforcement in said reward reservoir, said dispensing mechanism being communicatively connected to said first processor.

5. The trainer of claim 1, further comprising:
   a housing containing said behavior detector, said first processor and said reward dispenser; and
   a control panel disposed on a surface of said housing, said control panel configured to provide a programmable interface to said trainer.

6. The trainer of claim 1, wherein said first processor comprises:
   a microprocessor; and
   a memory in communicative connection with said microprocessor, said memory containing a plurality of operating steps and at least one sequence profile.

7. The trainer of claim 1, wherein said behavior detector senses at least one of sound, visual images, vibration, gnawing pressure and scratching behavior.

8. The trainer of claim 1, wherein said behavior detector is a vibratory bark sensor, said vibratory bark sensor comprising:
   a probe for touching skin of said animal; and
   a piezo-electric device, said probe mechanically connected to said piezo-electric device, said piezo-electric device configured to convert vibratory energy to an electrical signal.

9. The trainer of claim 8, wherein said animal collar includes a second processor to process said electrical signal and thereby produce an information signal, said information signal being communicated to said first processor.

10. The trainer of claim 1 further comprising:
    a receiver communicatively connected to said first processor; and
    a housing containing said receiver, said first processor and said reward dispenser.

11. A method of automatically altering the behavior of an animal, comprising the steps of:
    detecting a behavior of said animal with a behavior detector located on an animal collar;
    wirelessly transmitting a signal to a first processor indicative of said behavior, said first processor being located separate from said animal collar;
    controlling a reward dispensing device by said first processor dependent upon said signal;
    utilizing a sequence profile to determine a time interval until said reward dispensing device is activated;
    if said behavior is not detected then determining if said time interval has been at least one of equaled and exceeded, if said time interval has been at least one of equaled and exceeded then further comprising the steps of:
       dispensing a secondary reinforcement;
       determining if a primary reinforcement is to be dispensed by said reward dispensing device; and
       at least partially replacing said primary reinforcement with said secondary reinforcement.

12. The method of claim 11, wherein if it is determined that said primary reinforcement is to be dispensed then dispensing said primary reinforcement.

13. The method of claim 11, wherein if said behavior is detected then further comprising the step of resetting a duration clock.

14. The method of claim 11, wherein said behavior detector is a vibratory bark sensor, said vibratory bark sensor comprising:
    a probe for touching skin of said animal; and
    a piezo-electric device, said probe mechanically connected to said piezo-electric device, said piezo-electric device configured to convert vibratory energy to an electrical signal.

15. The method of claim 14, further comprising the steps of:
    processing said electrical signal by a second processor attached to said animal collar thereby produce an information signal; and
    communicating said information signal to said first processor.

16. The method of claim 11, wherein said sequence profile determines if only said secondary reinforcement is dispensed in lieu of said primary reinforcement.

* * * * *